United States Patent [19]
Fimeri

[11] Patent Number: 4,881,418
[45] Date of Patent: Nov. 21, 1989

[54] PIVOTABLE SCREW JACK DRIVE

[75] Inventor: Garry G. Fimeri, Morphett Vale, Australia

[73] Assignee: Britax Rainsfords Pty. Ltd., Adelaide, Australia

[21] Appl. No.: 130,265

[22] Filed: Dec. 8, 1987

[30] Foreign Application Priority Data

Dec. 12, 1986 [AU] Australia ................ PH9492

[51] Int. Cl.[4] ............... F16H 25/20; G02B 7/18; G05G 11/00
[52] U.S. Cl. .................. 74/89.14; 74/89.15; 74/424.8 R; 74/425; 74/479; 350/637
[58] Field of Search .......... 74/89.14, 89.15, 425, 74/424.8 R, 479; 350/637

[56] References Cited

U.S. PATENT DOCUMENTS

| | | | |
|---|---|---|---|
| 2,311,972 | 2/1943 | Simpson | 74/89.15 |
| 3,069,924 | 12/1962 | Watanabe et al. | 74/424.8 R |
| 3,978,735 | 9/1976 | Repay et al. | 74/89.15 |
| 4,482,211 | 11/1984 | Fisher | 74/89.15 X |
| 4,498,738 | 2/1985 | Kumai | 74/471 XY |
| 4,509,382 | 4/1985 | Colautti et al. | 74/89.15 X |
| 4,598,605 | 7/1986 | Manzoni | 74/502.1 |

Primary Examiner—Allan D. Herrmann
Attorney, Agent, or Firm—Klauber & Jackson

[57] ABSTRACT

A pivotable screw jack drive for a tiltable element (11, 12) such as a rear view mirror of a motor vehicle, wherein a motor driven worm wheel (31) also performs the function of a jacking nut (29) which rotates about a jacking screw (35), the projecting end (41) of the jacking screw being connected to the tiltable element (11,12) for universal pivotal movement but being restrained against relative rotation, the jacking nut (29) being mounted in a housing (22) with a ball joint so that the nut and screw pivot as an assembly.

10 Claims, 2 Drawing Sheets

PIVOTABLE SCREW JACK DRIVE

This invention relates to a pivotable screw jack drive when in combination with a tilting element, for use in tilting control of position of that element, for example, of a rear vision mirror. The invention extends to a rear vision mirror assembly which embodies such a screw jack drive for tilting control.

BACKGROUND OF THE INVENTION

The positioning of a tiltable element relates to rotation of that element about the two principal axes, which, in most instances, are contained within a single plane. Such rotation can either be achieved by applying a lifting or lowering force at three or more points, or by supporting the tiltable element on a pivot point and providing two lifting or lowering forces at spaced positions which most desirably form an angle of 90° with respect to the pivot point. The invention is particularly useful with the latter arrangement.

An example of a tiltable element that would be adjusted in the above manner is a rear view mirror of a motor vehicle, and the invention is particularly applicable thereto. Rear view mirrors require adjustment to suit different drivers or different driving positions. Frequently, adjustment of external rear view mirrors for the required accuracy is difficult due to at least one of the mirrors being distant from the driving position. Therefore, some means for remotely adjusting the tilt of a mirror is desirable.

PRIOR ART

This problem has been recognised, and screw jacks have been proposed heretofore. By far the most relevant prior art known is disclosed in the U.S. Pat. No. 4,482,211 in the name of Fisher, which also related to a pair of screw jacks which, with a rear vision mirror ball mounting, subtended an angle of 90° to each other.

The use of a screw jack to adjust a tiltable element of a mirror requires pivotal movement of the screw jack in relation to the mirror, and such tilting movement must be universal. Therefore one end of the screw jack must not only be pivotally attached with respect to the mirror backing, but the opposite end of the screw jack must also be able to pivot.

In the past, as in aforesaid U.S. Pat. No. 4,482,211 providing pivots at both ends of the screw jack together with a drive means for extension and retraction of the screw jack has resulted in a complicated design and a large number of components being used. For example, in the aforesaid Patent, the jacking member of the screw jack was provided with an external thread which was indirectly engaged by a ring gear, which itself was driven by an electric motor via a worm gear. The jacking member was coupled to the ring gear through a ball-shaped member contained within an annulus in the ring gear, and which was pivotal within the ring gear but not rotatable with respect thereto about the gear's axis of rotation. Although this provided an excellent mechanical arrangement, there was an excessive number of components, all requiring close tolerances of fit and time consuming assembly, and as a consequence some of the components were very small and lacked the robustness which this invention seeks to achieve.

It is an object of this invention to provide a screw jack drive which overcomes the abovementioned problems and results in a drive system that has a smaller number of components, which is easier to assemble, and which has improved reliability of operation.

BRIEF SUMMARY OF THE INVENTION

In its broadest form, the invention comprises a pivotable screw jack drive for a tiltable element such as a rear view mirror of a motor vehicle, wherein a motor driven worm wheel also performs the function of a jacking nut which rotates about a jacking screw, the projecting end of the jacking screw being connected to the tiltable element for universal pivotal movement but being restrained against relative rotation, the jacking nut being mounted in a housing with a ball joint so that the nut and screw pivot as an assembly. The nut has around its periphery gear teeth which define the worm wheel, for example, of cylindrical shape, and a motor has a worm which engages the gear teeth to effect rotation of the nut and consequent tilting of the tiltable element, and consequential pivoting of the nut and screw is accommodated by movement of the gear teeth across the drive worm.

More specifically, the invention consists of a combination of a tiltable element and a pivotable screw jack drive which controls tilting of the element, and which comprises a housing, a jacking nut bearing surface in a wall of the housing, a jacking nut having an outer surface which is also a bearing surface, an inner threaded surface, and a series of gear teeth spaced around its periphery defining a worm wheel, at least one of the bearing surfaces being of part spherical shape, a motor assembly within the housing having an output shaft, a drive worm on the output shaft in driving engagement with the worm wheel, a jacking screw having a first end with a threaded male portion which threadably engages said inner threaded surface of the jacking nut, and a second end which engages said element for relative pivotal movement about an axis which is perpendicular to the axis of the screw, and restraining means for restraining the screw from rotation, the arrangement being such that, upon motor rotation, the nut extends or retracts the jacking screw and effects tilting of the element.

An embodiment of the invention is described hereunder in some detail with reference to, and is illustrated in, the accompanying drawings, in which.

In this embodiment, the tiltable element of the invention is the rear vision mirror which is contained within an outer shroud 10 which is hinged in known manner to a mounting (not shown) secured to the outer surface of a motor vehicle in such a way that the shroud 10 will be displaced upon striking an obstruction. The invention however is not limited to such use and can be applied to other tiltable elements, or to rear vision mirrors which do not have this provision.

Figure 3:
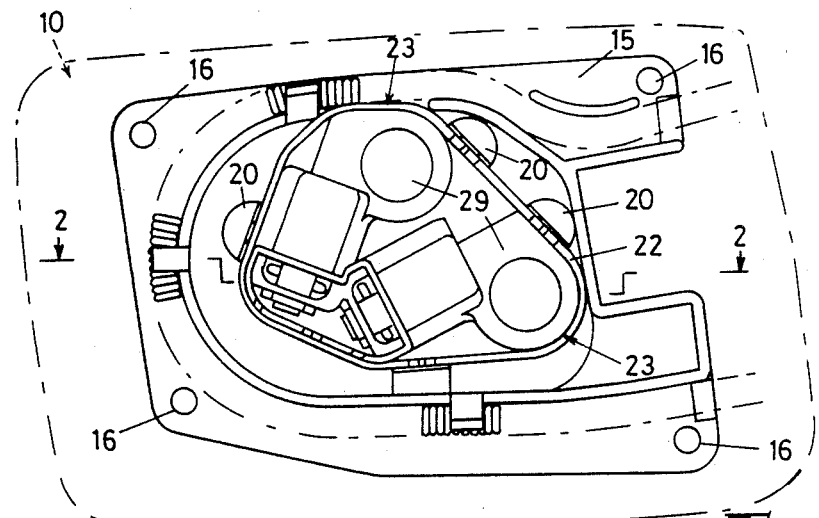
FIG. 3 is a front elevation of the motor housing assembly, FIG. 3 also identifying the cross-section plane 2—2.

The rear vision mirror 11 is carried on a mirror backing plate 12 (not shown in FIG. 3), the backing plate 12 being provided with a first ball socket 13 about which it can both universally pivot and rotate, the ball socket 13 engaging a ball 14 carried on a mounting plate 15 secured by screws 16 to the outer shroud 10. The requirement is to pivot the rear vision mirror 11 and its backing plate 12 with respect to the shroud, for rotation (in this embodiment) about both vertical and horizontal axes of the ball 14.

Figure 4:
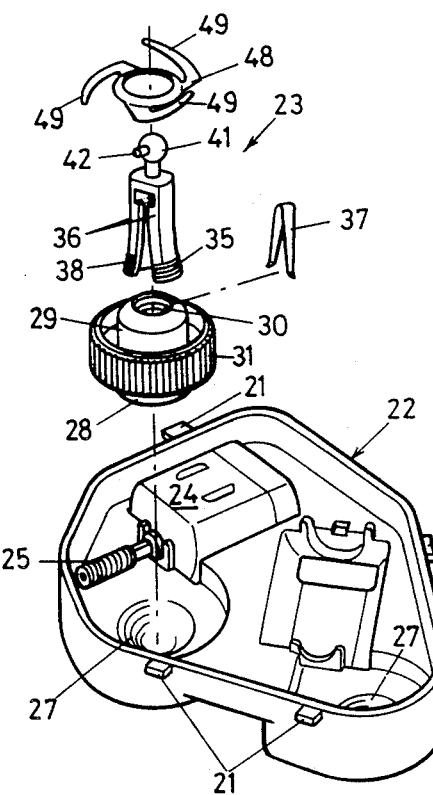
FIG. 4 is an "exploded" view of the motor housing assembly, with one screw jack and its drive motor removed.

The mounting plate 15 is provided with female lugs 20 (FIG. 3) which are engaged by protruding lugs 21 (FIG. 4) of a housing 22. The housing 22 contains two pivotal screw jack drives generally designated 23, and each being as shown in a larger scale in FIG. 5.

Each screw jack drive 23 comprises an electric motor assembly 24 of the reversible type, the output shaft of which carries on it a drive worm 25.

The housing 22 contains two part spherical hollow jacking nut bearing surfaces 27 (FIG. 4), and these are engaged by complementary part spherical bearing surfaces 28 of respective jacking nuts 29, each jacking nut 29 having an inner threaded surface 30, and a series of gear teeth 31 (which are either spur gear teeth or slightly helical to match the helix angle of the worm), the gear teeth 31 being spaced around the periphery of the jacking nut 29 to constitute a worm wheel which has a cylindrical envelope shape (that is, they are not concave teeth as with the ordinary worm wheel).

Figure 2:
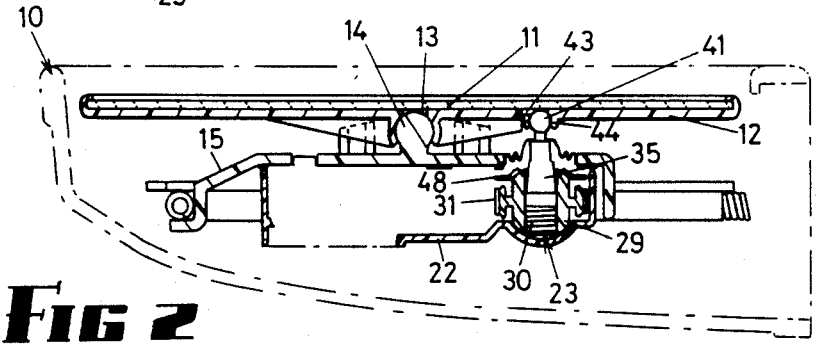
FIG. 2 is a cross-section taken on line 2—2 of FIG. 1, but omitting the motor and worm wheel assemblies.
Figure 5:
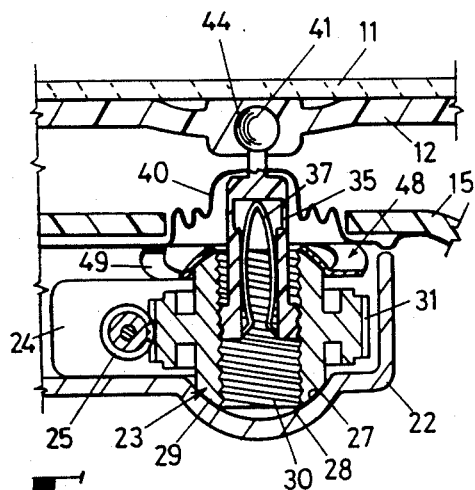
FIG. 5 is a cross-section through a screw jack assembly, which best illustrates the invention herein claimed.

A jacking screw 35 is bifurcate and has two limbs 36 (FIG. 4) which are splayed out by a resilient "U"shaped spring 37, the inner ends of the limbs 36 having male threads 38 thereon which threadably engage the inner threaded surface 30 of the jacking nut 29 as best seen in FIG. 5. The projecting end of each jacking screw 35 passes through a soft elastomeric gasket 40 located between the housing 22 and the mounting plate 15, and terminates at its upper end in a ball head 41, the ball head 41 having a projecting spigot 42 which constitutes a restraining portion, rotation of the jacking screw 35 being restrained by spigot 42 engaging a complementary surface of a slot 43 (FIG. 2), there being second and third ball sockets 44 each having a slot 43 opening into it, on the underside of the backing plate 12 of the mirror 11. The slots are directed towards the first socket 13. However the ball head 41 is otherwise movable within the part spherical socket 44 for the required pivotal movement in the two directions for vertical and horizontal adjustment of the position of the mirror 11. The arrangement therefore is such that, upon motor rotation, the worm 25 causes rotation of the jacking nut 29 to drive the jacking screw 35 outwardly or withdraw it back into the nut. In the event of there being excessive drive, the bifurcate limbs 36 merely spring together as the threads ride over one another, and this constitutes an in-built overload protection device. By driving the jacking screw 35 outwardly or withdrawing it inwardly, the backing plate 12 is tilted about the ball socket 13 in either one of the two planes, and since the ball heads 41 of the jacking screws 35 subtend an angle of 90° with each other with respect to the bolt ball socket 13, the adjustment takes place in either one of the two planes.

Figure 6:
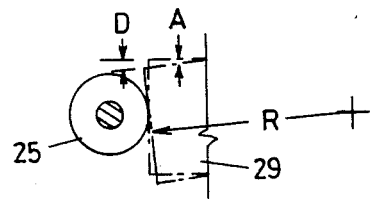
FIG. 6 is a geometric representation of the movement of the gear teeth across the drive worm, which takes place upon pivotal movement of the nut and screw assembly.

However, tilting of the mirror 11 necessarily means that there is some tilting of the assembly of the jacking nut 29 and jacking screw 35, and this causes the gear teeth 31 to move across the thread of the worm 25 by a small degree only. FIG. 6 illustrates the geometry of this movement, and the displacement angle A from central position is very small (a small adjustment only being required for the mirror) and this corresponds to a distance D. The difference in engagement between the teeth and the threads of the worm is therefore extremely small, being trigonomically identified by (1-R cos A), wherein R is the radius of tilt, this being so small as to be negligible in the application described herein. It is recognition of this factor which enables the entire arrangement to work very satisfactorily under a wide range of conditions, with parts which are not so small as with previously proposed similar arrangements, since there is no articulation required between the jacking screw 35 and the jacking nut 29. Parts therefore are lower in cost, fewer in number and much more rugged.

Figure 1:
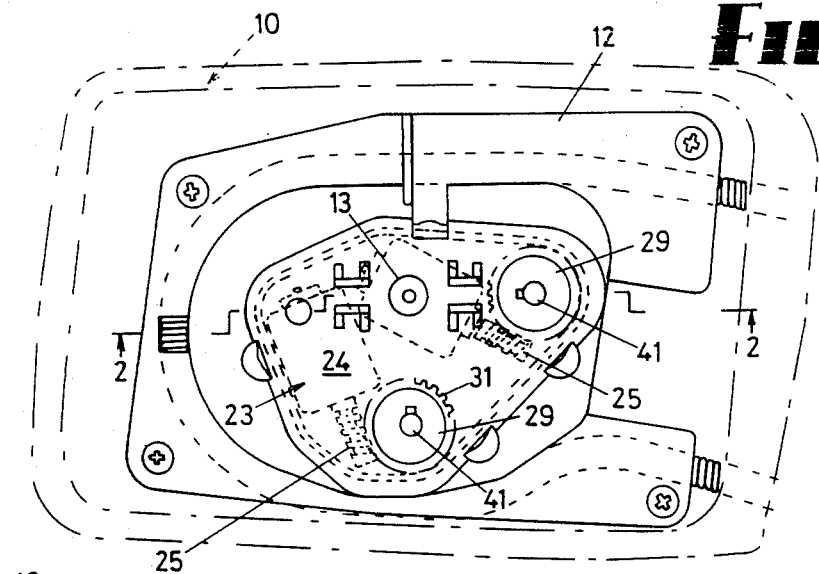
FIG. 1 is a rear elevation of a rear view mirror (that is, viewed in a rearward direction) with respect to a motor vehicle on which it is mounted.

As seen in FIG. 1, there are two ball heads 41 which engage in complementary ball sockets 44 on the backing plate 12, and these subtend an angle of 90° with the center of the ball and socket joint 13/14, so that pivotal movement effected by one screw jack drive 23 in, say, an X-Y plane does not affect adjustment in the Y-Z plane, and vice versa.

As the pivotal movement of the assembly of jacking screw and jacking nut takes place, there must be some lateral displacement intermediate the ends and this is accommodated by means of a three limb spring 48 which engages the upper surface of the jacking nut 29, and the limbs 49 thereof bear upwardly against the underside of the soft gasket 40 and reacts, through gasket 40, against the mounting plate 15 which performs the dual function of providing a moisture barrier for the inner space within the housing 22 and also facilitating the very small amount of lateral movement required between the limbs 49 and the mounting plate 15.

A consideration of the geometry as best seen in FIG. 5 will indicate that the lateral movement of the assembly of jacking nut 29 and jacking screw 35 is extremely limited in the plane which includes the central axis of the worm 25 because the center of rotation of the bearing surface 28 is coplanar with the axis of the drive worm 25 when the longitudinal central axis of the assembly is in its medial position.

I claim:

1. In combination with a tiltable element, a pivotable screw jack drive for tilting control of the element, comprising:
    a housing, a jacking nut bearing surface of concave part-spherical shape in a wall of the housing,
    a single piece jacking nut having an outer surface which is a complementary convex part-spherical shape against which said jacking nut surface bears, an inner threaded surface, and a series of gear teeth spaced around its periphery defining a worm wheel,
    a motor assembly within the housing having an output shaft, a drive worm on the output shaft, said drive worm having threads in direct meshing contact with the gear teeth of the worm wheel to drive the worm wheel,
    a jacking screw having a first end with a threaded male portion which is threadably engaged in direct mating contact with said inner threaded surface of the jacking nut, and a second end which engages said element for relative pivotal movement about an axis which is perpendicular to the axis of the screw, and restraining means for restraining the screw from rotation, the arrangement being such that, upon motor rotation, the nut extends or retracts the jacking screw and effects tilting of the element.

2. A pivotable screw jack according to claim 1 wherein the envelope shape of the worm wheel is cylindrical.

3. A pivotable screw jack according to claim 1 wherein said restraining portion of said second end of the jacking screw comprises a restraining spigot which so engages a complementary surface of a slot in the element as to restrain the screw from rotation.

4. A pivotable screw jack according to claim 1 wherein said jacking screw second end also comprises a part spherical surface, and said element contains a part spherical socket complementary to and engaged by said screw part spherical surface.

5. A pivotable screw jack according to claim 1 wherein said jacking screw first end is bifurcate, having two limbs each with outer curved thread surfaces which threadably engage said inner threaded surface of the jacking nut, and a "U"-shaped spring between said limbs urging their threaded surfaces into that engagement.

6. A pivotable screw jack according to claim 1 wherein said tiltable element comprises a backing plate of a rear vision mirror for a motor vehicle.

7. In combination with a tiltable element, a pivotable screw jack drive for tilting control of the element, comprising:

a housing, a jacking nut bearing surface of concave part-spherical shape in a wall of the housing, a jacking nut having an outer surface which is a complementary convex part-spherical shape against which said jacking nut surface bears, an inner threaded surface, and a series of gear teeth spaced around its periphery defining a worm wheel, a motor assembly within the housing having an output shaft, a drive worm on the output shaft in driving engagement with the worm wheel, a jacking screw having a first end with a threaded male portion which threadably engages said inner threaded surface of the jacking nut, and a second end which engages said element for relative pivotal movement about an axis which is perpendicular to the axis of the screw, and restraining means for restraining the screw from rotation, a mounting plate, means joining the housing to the mounting plate, and a spring engaging said part-spherical surface of said jacking nut, the spring having projecting limbs which react against a surface of the mounting plate, thereby retaining said jacking nut outer surface in contact with said jacking nut bearing surface, the arrangement being such that, upon motor rotation, the nut extends or retracts the jacking screw and effects tilting of the element.

8. A pivotable screw jack according to claim 7 further comprising a soft gasket contiguous with a surface of said mounting plate and between said mounting plate and spring limbs.

9. A rear vision mirror assembly for a motor vehicle comprising:

a backing plate, a part-spherical surface of the backing plate which defines a first element of a first ball and socket joint, a mounting plate, a second element of the first ball and socket joint on the mounting plate engaging the first element thereof for relative pivotal and rotational movement of the backing plate with respect to the mounting plate, two further part-spherical surfaces of the backing plate being concave and defining respectively first elements of second and third ball and socket joints in the backing plate, which subtend an angle of 90° with the first said ball and socket two pivotable screw jack drives, each including:

a housing, a jacking nut bearing surface of concave part-spherical shape in a wall of the housing, a jacking nut having an outer surface which is a complementary convex part-spherical shape against which said jacking nut surface bears, an inner threaded surface, and a series of gear teeth spaced around its periphery defining a worm wheel, a motor assembly within the housing having an output shaft, a drive worm on the output shaft in driving engagement with the worm wheel, a jacking screw having a first end with a threaded male portion which threadably engages said inner threaded surface of the jacking nut, and a second end which engages said element for relative pivotal movement about an axis which is perpendicular to the axis of the screw, and restraining means for restraining the screw from rotation, the arrangement being such that, upon motor rotation, the nut extends or retracts the jacking screw and effects tilting of the element, respective springs co-acting between the mounting plate and the jacking nut part-spherical surfaces retaining said screw jack drives between the mounting plate and the housing, said second ends of said jacking screws comprising the second elements of said second and third ball and socket joints, and pivotally engaging respective said further backing plate surfaces.

10. A rear vision mirror assembly according to claim 9 wherein each ball and socket joint first element is a socket and second element its complementary ball, and further comprising slot surfaces in said backing plate defining two slots opening into said second and third sockets and directed therefrom towards the first said ball and socket joint, and respective spigots projecting from the balls of said second and third ball and socket joints engaging walls of said slots and restraining those balls against rotation.

* * * * *